(12) United States Patent
Zou et al.

(10) Patent No.: US 10,041,970 B2
(45) Date of Patent: Aug. 7, 2018

(54) HIGH SPEED ADAPTIVE-MULTI-LOOP MODE IMAGING ATOMIC FORCE MICROSCOPY

(71) Applicant: Rutgers, The State University of New Jersey, New Brunswick, NJ (US)

(72) Inventors: Qingze Zou, Bridgewater, NJ (US); Juan Ren, Edison, NJ (US); Jiangbo Liu, Piscataway, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 15/326,237

(22) PCT Filed: Jul. 14, 2015

(86) PCT No.: PCT/US2015/040273
§ 371 (c)(1),
(2) Date: Jan. 13, 2017

(87) PCT Pub. No.: WO2016/010963
PCT Pub. Date: Jan. 21, 2016

(65) Prior Publication Data
US 2017/0199219 A1 Jul. 13, 2017

Related U.S. Application Data (60) Provisional application No. 62/024,163, filed on Jul. 14, 2014.

(51) Int. Cl.
*G01Q 10/00* (2010.01)
*G01Q 10/06* (2010.01)
*G01Q 60/34* (2010.01)

(52) U.S. Cl.
CPC ........... *G01Q 10/065* (2013.01); *G01Q 60/34* (2013.01)

(58) Field of Classification Search
CPC ............................. G01Q 10/065; G01Q 60/34
USPC ................................................. 850/1, 3, 4, 5
See application file for complete search history.

(56) References Cited

U.S. PATENT DOCUMENTS

| 8,370,961 B1 | 2/2013 | Moon et al. |
| 2004/0009757 A1 | 1/2004 | Subrahmanya et al. |
| 2013/0347147 A1 | 12/2013 | Zou et al. |

FOREIGN PATENT DOCUMENTS

| JP | 2004340772 A | 12/2004 |
| WO | 2013/061126 A1 | 5/2013 |

*Primary Examiner* — Nicole Ippolito
*Assistant Examiner* — Hanway Chang
(74) *Attorney, Agent, or Firm* — Fox Rothschild LLP (57) ABSTRACT

A method for imaging a sample using a high speed dynamic mode atomic force microscope may include scanning a tip of a cantilever probe over a surface of the sample, regulating a vibration amplitude of the tip to remain constant at a set point value ($A_{set}$), via a first signal generated in a first feedback controller, measuring a mean tapping deflection of the tip, regulating the mean tapping deflection via a second signal generated in a second feedback controller, tracking and measuring an adjustment to the measured mean tapping deflection during the regulating. The method may further include generating an image topography of the sample based on the first signal, the second signal, and the measured adjustment of the mean tapping deflection of the cantilever probe.

22 Claims, 9 Drawing Sheets

HIGH SPEED ADAPTIVE-MULTI-LOOP MODE IMAGING ATOMIC FORCE MICROSCOPY

BACKGROUND

The present disclosure generally relates to systems and methods of operating an atomic force microscope (AFM) in one or more dynamic modes (DM), including without limitation, the tapping mode (TM) and the non-contact mode (NCM), as well as the peak force mode (PFM) and the contact mode (CM), with increased speed, while preserving the inherent characteristics of superior image quality and reducing the probe sample interaction force in each mode. More specifically, the present disclosure generally relates to systems and methods that take into account the variation of the mean deflection (or the deflection in the contact mode) of a probe in quantifying a sample topography, and utilizes and integrates: (i) an inner-outer feedback loop to regulate the mean cantilever deflection around the minimal level needed to maintain a stable probe-sample interaction in the corresponding imaging mode, (ii) an online iterative feedforward controller, (iii) an online optimization of the vibration amplitude ratio, and (iv) a feedback controller to the probe vibration generator that minimizes the set-point of the vibration amplitude, and to the root-mean-square (RMS) probe oscillation amplitude feedback controller.

AFMs are a type of high resolution scanning probe microscopes with resolutions in the range of fractions of a nanometer. In atomic force microscopy, a microscale cantilever with a sharp tip (probe) at its end may be used to scan the surface of a sample. When the tip is brought into proximity of a sample surface, the forces between the tip and the sample may lead to a deflection of the cantilever in accordance with Hooke's Law. Typically, the deflection of the cantilever is measured to obtain the sample's topography.

An AFM may be operated in a number of imaging modes, including contact modes (CM) (also called static modes) and a variety of dynamic modes, including without limitation, the TM, PFM, and NCM. In dynamic mode imaging, the cantilever is driven to oscillate vertically with constant amplitude of oscillation. Due to the interaction forces acting on the cantilever when the tip comes close to the surface of the sample, the amplitude of the oscillation may decrease. In conventional DM imaging, a microprocessor, a digital signal processor, or a field programmable gate array (FGPA) based system along with the underline control algorithms is typically used to control the height of the cantilever above the sample to maintain a constant oscillation amplitude (as in TM and NCM imaging) or constant peak repulsive force amplitude (as in PFM imaging) as the cantilever is scanned over the sample surface. The sample topography image in a DM microscope is produced by using the RMS displacement of the cantilever in the vertical direction, provided that the cantilever oscillation amplitude is well maintained at the desired set-point value during the scanning.

DM-imaging mode imaging typically produces better image quality and lesser sample distortion compared to the CM-imaging techniques due to the reduction in capillary force, friction and shear force, and contact pressure. However, DM-imaging speeds tend to be substantially slower because increasing the imaging speeds can lead to loss of interaction between the probe and the sample and/or dampening of the cantilever tapping vibration (particularly when the sample size is large).

As with most measuring devices, AFMs often require a trade-off between quality and acquisition speed. That is, some currently available AFMs can scan a surface with sub-angstrom resolution. These scanners are capable of scanning only relatively small sample areas, and even then, at only relatively low scan rates. For example, traditional commercial TM-imaging AFMs usually require a total scan time typically taking up to ten minutes to cover an area of several microns at high resolution (e.g., 512×512 pixels) and low probe-sample interaction force. The imaging speed of the PFM is generally similar to the imaging speed of the TM, whereas the imaging speed of the NCM is generally slower than the TM. This is primarily because TM and PFM operate in the repulsive force or the intermediate level between repulsive force and attractive force regions, while NCM operates purely in the attractive force region with the probe hovering further above the sample surface, and the probe-sample interaction force is much more sensitive to the probe-sample spacing in the attractive force region. As the probe-sample interaction force is much more sensitive to the probe-sample spacing in the attractive region, non-contact-mode imaging tends to be much slower than tapping-mode imaging. The practical limit of AFM scan speed is a result of the maximum speed at which the sample can be scanned while maintaining a probe-sample interaction force that is low enough not to damage or cause non-negligible damage to the tip and/or the sample.

Hence, there is a need for high-speed DM-imaging and/or CM-imaging technique that has a controlled interaction force and is suitable for imaging large size samples.

SUMMARY

The method for imaging a sample using a high speed dynamic mode atomic force microscope is disclosed. The may include scanning a tip of a cantilever probe over a surface of the sample, regulating a vibration amplitude of the tip to remain constant at a set point value ($A_{set}$), via a first signal generated in a first feedback controller, measuring a mean tapping deflection of the tip, regulating the mean tapping deflection via a second signal generated in a second feedback controller, tracking and measuring an adjustment to the measured mean tapping deflection during the regulating. The method may further include generating an image topography of the sample based on the first signal, the second signal, and the measured adjustment of the mean tapping deflection of the cantilever probe. In an embodiment, the high-speed dynamic mode atomic force microscopy may include one or more of the following tapping mode, non-contact mode, and peak force tapping mode.

In certain embodiments, regulating the mean tapping deflection may include determining a desired mean deflection using a ratio of $A_{set}$ and a free amplitude, and adjusting the measured mean tapping deflection to the desired mean deflection. In an embodiment, the desired mean deflection is determined such that the ratio of $A_{set}$ and the free amplitude is from about 10%-30%.

In some embodiment, the second feedback controller may include an inner-outer feedback loop structure. The outer feedback loop may regulate the mean tapping deflection, and an inner loop nested within the outer loop may perform the tracking and measuring of the adjustment to the measured mean tapping deflection during the regulating. In an embodiment, the outer feedback loop is a proportional integral derivative (PID)-type controller having PID parameters $K_P$, $K_I$ and $K_D$. In at least one embodiment, the PID-type controller may employ the following algorithm:

$$d_{TM\text{-}set}(j+1)=k_I d_{TM\text{-}set}(j)+k_P e_{TM}(j)+k_D[e_{TM}(j-1)-e_{TM}(j)]$$

for $e_{TM}(j)=d_{TM\text{-}d}-d_{TM}(j)$, and $j=2 \ldots N-1$

In an embodiment, the PID parameters have the following values: $K_P=1$, $K_I=1$, and $K_D=\rho$, and wherein $\rho$ is a sample point-to-point gradient factor. In an embodiment, $\rho<1$.

Alternatively and/or additionally, the PID-type controller may employ the following algorithm:

$$d_{set,0}=d_{set,org},$$

$$d_{set,k+1}=d_{set,k}-[\min(\hat{d}_{k+1}(t))-D^*_{min}], k \geq 1$$

with $\hat{d}_{k+1}(t) \triangleq d_k(t)+\rho[(d_k(t)-d_{k-1}(t))]$, for $t \in [0, T_{scan}]$, In some embodiments, the method may also include optimizing $A_{set}$ online based on a real time relationship between the measured mean deflection and vibration amplitude ratio of the $A_{set}$ and a free amplitude. The method may further include predicting a next-line sample topography and a next-line tracking error for tracking of the mean tapping deflection adjustment, via a third feedback controller. In some embodiments, the method may also include utilizing the prediction of the next-line sample topography and the next-line tracking error to reduce tracking error in a region of the surface of the sample with a feature providing a sudden and dramatic change comprising a cliff or an edge. In at least one embodiment, utilizing the prediction of the next-line sample topography and the next-line tracking error to reduce tracking error may include obtaining a next-line desired trajectory using:

$$h_{ffd,k+1}(j)=h_k(j)+\alpha[d_{TM,k}(j)-d_{TM\text{-}d}], j=1, \ldots N_1.$$

In an embodiment, the value of a may be tuned based on an estimated height of the feature.

Alternatively and/or additionally, the feedforward controller may also include a zero-phase low-pass filter configured to filter noise from being fed back to the feedforward controller.

In some embodiments, the third feedback controller may be a feedforward controller comprising a data-driven iterative learning controller. The feedforward controller may implement the following algorithm to obtain a control input:

$$U_{ff,0}(j\omega) = 0,$$

$$U_{ff,1}(j\omega) = \frac{U_{ff+fb,0}(j\omega)}{Z_0(j\omega)} H_{ffd,1}(j\omega),$$

$$U_{ff,k+1}(j\omega) = U_{ff,k} + \lambda \frac{U_{ff+fb,k}(j\omega) - U_{ff+fb,k-1}(j\omega)}{Z_k(j\omega) - Z_{k-1}(j\omega)} e_k(j\omega), k \geq 1$$

$$e_k(j\omega) = H_{ffd,k+1}(j\omega) - Z_k(j\omega)$$

In certain embodiments, obtaining the next-line desired trajectory may also include performing repetitive scans on a first line until a convergence is reached, and using the convergence as an initial input for an iteration of a next scan line.

In another aspect of the disclosure, a method of imaging a sample using a high speed dynamic mode atomic force microscope is disclosed. The method may include scanning a tip of a cantilever probe over a surface of the sample, regulating a vibration amplitude of the tip to remain constant at a set point value ($A_{set}$), via a first signal generated in a first feedback controller. The method may also include measuring a mean tapping deflection of the tip, regulating the mean tapping deflection via a second signal generated in a second feedback controller, tracking and measuring an adjustment to the measured mean tapping deflection during the regulating, predicting a next-line sample topography and a next-line tracking error for tracking of the mean tapping deflection adjustment, via a third feedback controller, using the predicted next-line sample topography and the next-line tracking error in regulating the mean tapping deflection, and generating an image topography of the sample based on the first signal, the second signal, and the measured adjustment of the mean tapping deflection of the cantilever probe.

In certain embodiments, the method may also include an online iterative control applied to a z-piezo actuator to maintain stable tapping. In an embodiment, applying the online iterative control comprises regulating $A_{set}$ by adjusting it online and point-by-point.

In certain embodiments, regulating the mean tapping deflection may include determining a desired mean deflection using a ratio of $A_{set}$ and a free amplitude, and adjusting the measured mean tapping deflection to the desired mean deflection. In an embodiment, the desired mean deflection is determined such that the ratio of $A_{set}$ and the free amplitude is from about 10%-30%.

In some embodiment, the second feedback controller may include an inner-outer feedback loop structure. The outer feedback loop may regulate the mean tapping deflection, and an inner loop nested within the outer loop may perform the tracking and measuring of the adjustment to the measured mean tapping deflection during the regulating. In an embodiment, the outer feedback loop is a proportional integral derivative (PID)-type controller having PID parameters $K_P$, $K_I$, and $K_D$. In at least one embodiment, the PID-type controller may employ the following algorithm:

$$d_{TM\text{-}set}(j+1)=k_I d_{TM\text{-}set}(j)+k_P e_{TM}(j)+k_D[e_{TM}(j-1)-e_{TM}(j)]$$

for $e_{TM}(j)=d_{TM\text{-}d}-d_{TM(j)}$, and $j=2 \ldots N-1$

In an embodiment, the PID parameters have the following values: $K_P=1$, $K_I=1$, and $K_D=\rho$, and wherein $\rho$ is a sample point-to-point gradient factor. In an embodiment, $\rho<1$.

Alternatively and/or additionally, the PID-type controller may employ the following algorithm:

$$d_{set,0}=d_{set,org},$$

$$d_{set,k+1}=d_{set,k}-[\min(\hat{d}_{k+1}(t))-D^*_{min}], k \geq 1$$

with $\hat{d}_{k+1}(t) \triangleq d_k(t)+\rho[(d_k(t)-d_{k-1}(t))]$, for $t \in [0, T_{scan}]$, In some embodiments, the method may also include utilizing the prediction of the next-line sample topography and the next-line tracking error to reduce tracking error in a region of the surface of the sample with a feature providing a sudden and dramatic change comprising a cliff or an edge. In at least one embodiment, utilizing the prediction of the next-line sample topography and the next-line tracking error to reduce tracking error may include obtaining a next-line desired trajectory using:

$$h_{ffd,k+1}(j)=h_k(j)+\alpha[d_{TM,k}(j)-d_{TM\text{-}d}], j=1, \ldots N_1.$$

In an embodiment, the value of a may be tuned based on an estimated height of the feature.

Alternatively and/or additionally, the feedforward controller may also include a zero-phase low-pass filter configured to filter noise from being fed back to the feedforward controller.

In some embodiments, the third feedback controller may be a feedforward controller comprising a data-driven iterative learning controller. The feedforward controller may implement the following algorithm to obtain a control input:

$$U_{ff,0}(j\omega) = 0,$$

$$U_{ff,1}(j\omega) = \frac{U_{ff+fb,0}(j\omega)}{Z_0(j\omega)} H_{ffd,1}(j\omega),$$

$$U_{ff,k+1}(j\omega) = U_{ff,k} + \lambda \frac{U_{ff+fb,k}(j\omega) - U_{ff+fb,k-1}(j\omega)}{Z_k(j\omega) - Z_{k-1}(j\omega)} e_k(j\omega), k \geq 1$$

$$e_k(j\omega) = H_{ffd,k+1}(j\omega) - Z_k(j\omega)$$

In certain embodiments, obtaining the next-line desired trajectory may also include performing repetitive scans on a first line until a convergence is reached, and using the convergence as an initial input for an iteration of a next scan line.

BRIEF DESCRIPTION OF THE FIGURES

The present disclosure will be better understood, and objects other than those set forth herein will become apparent when consideration is given to the following detailed description thereof. Such description makes reference to the attached drawings where.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects as illustrative. The scope of the disclosure is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout the specification may, but do not necessarily, refer to the same embodiment.

Furthermore, the described features, advantages and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

Reference throughout this specification to "one embodiment", "an embodiment", or similar language means that a particular feature, structure, or characteristic described in connection with the indicated embodiment is included in at least one embodiment of the present disclosure. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The current disclosure presents the use of embodiments to increase the speed of TM-mode imaging by way of example only. It will be understood to those skilled in the art that the embodiments may be used to increase the speed of other types of AFMs as well, such as, for example, PFM or NCM, without deviating from the principles of the current disclosure.

Figure 1A:
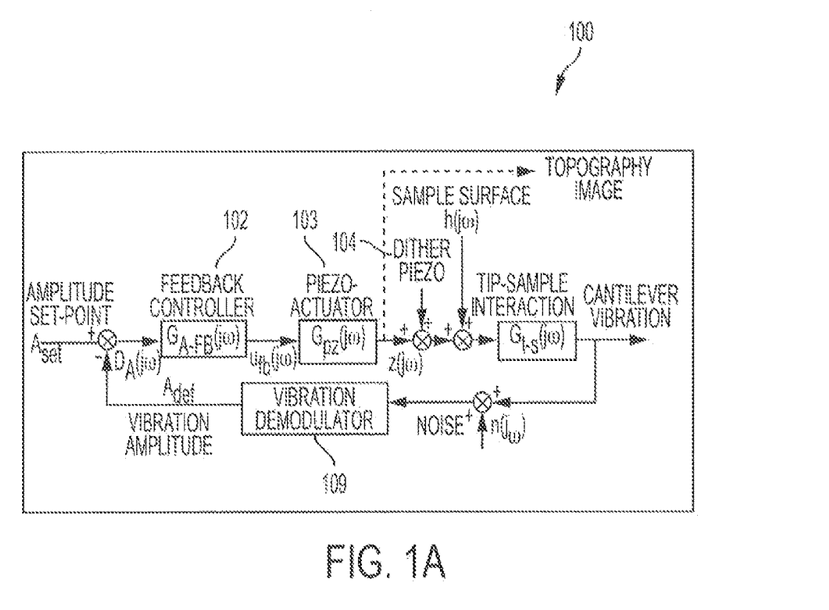
FIG. 1A illustrates an example prior art DM-imaging AFM microscope block diagram.

Referring now to FIG. 1A, there is provided an example prior art DM-imaging AFM block diagram. As noted above, the cantilever probe in DM-imaging is excited to vibrate consistently. The vibrations may cause the probe tip to interact with the sample surface 105. A vibration demodulator 308 may be used to measure the amplitudes of interest (e.g., the RMS-tapping amplitude in the TM imaging, the peak force amplitude in the PFM imaging, i.e., the amplitude of the repulsive force, and the RMS oscillation amplitude in the NCM imaging). In the case of TM or NCM imaging, a lock-in-amplifier 109 may be used to measure the vibration "root mean square" amplitude (RMS) at any given time. In PFM imaging, a differentiator may be used to measure the maximum repulsive amplitude of the probe vibration in each period. The amplitude of vibrations may vary in accordance with the sample topography because of the interaction of forces (Van der Waals forces, dipole-dipole interactions, electrostatic forces, etc.) acting on the probe when it comes close to the surface that cause the amplitude of this oscillation to decrease as the tip gets closer to the sample. A feedback controller 102 (e.g., RMS z-feedback controller) may be deployed to keep the measured amplitude (e.g., RMS amplitude or peak force amplitude) constant throughout the imaging process at a desired set-point value $A_{set}$. The feedback controller may use a piezoelectric actuator 103 to keep the amplitude constant at $A_{set}$. The displacement in the piezoelectric actuator 103 may be measured to quantify the sample topography. In dynamic mode imaging and the PFM imaging, the probe wear and/or sample damage attributed to the sliding of the probe over the sample surface (as in CM-mode imaging) are largely avoided, resulting in higher sample resolution.

Figure 1B:
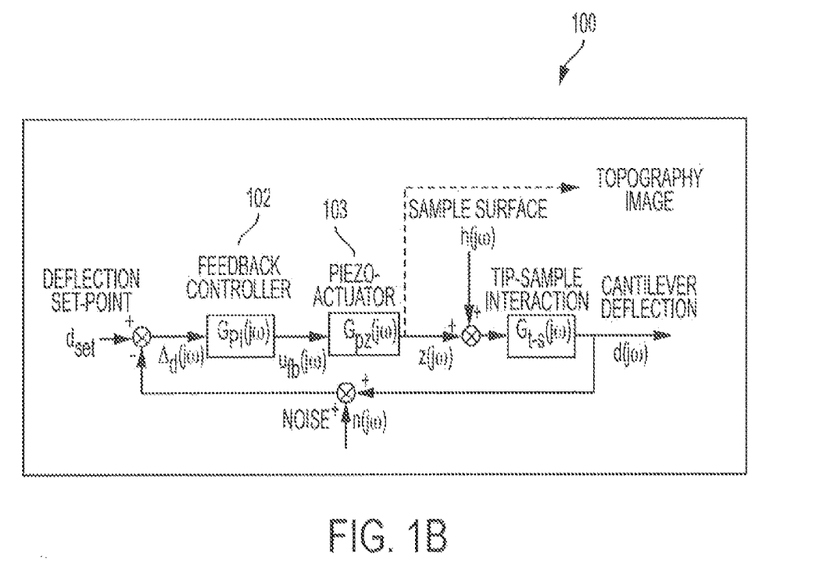
FIG. 1B illustrates an example prior art contact mode imaging AFM microscope block diagram.
Figure 1C:
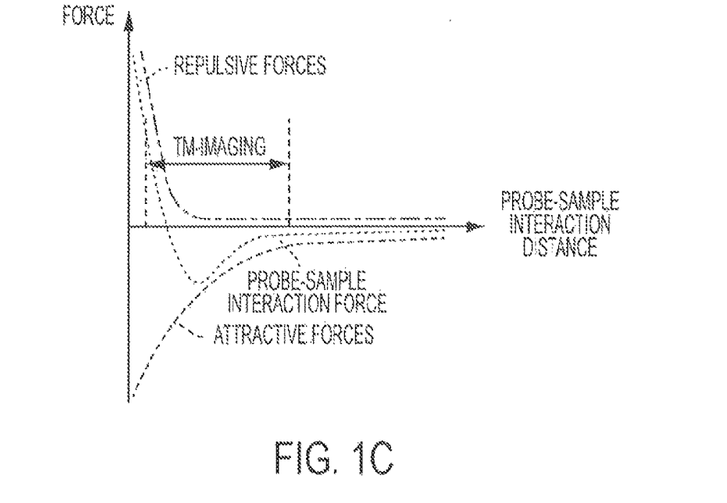
FIG. 1C is a graph illustrating an example relationship of the probe-sample interaction force with respect to the probe-sample distance in a TM-imaging AFM microscope, according to an embodiment.

As shown in FIG. 1B, the probe sample interaction force that in turn controls the amplitude is non-linear and is a function of probe sample distance. Therefore, changes in probe sample distance at higher imaging speeds may lead to damping of the vibration (tapping) or loss of probe sample contact.

Typically, in DM-imaging, multiple periods of vibration need to be acquired in order to measure the amplitude (e.g., the tapping amplitude in TM imaging, the peak force amplitude in PFM imaging, or the oscillation amplitude in NCM imaging). This may induce a time delay in the feedback controller loop, and the measured amplitude may differ from (lag behind) the actual instantaneous tapping amplitude of the cantilever probe. The adverse effect of this time delay on the feedback controller 102 becomes negligible at low scanning speeds only.

As an example, in the prior art TM-imaging (it should be noted that use of TM-mode imaging is by way of example only) modules have endeavored to increase the speed of imaging by choosing a large free vibration amplitude ($A_{free}$) and a smaller tapping amplitude set point ($A_{set}$). However, this leads to large probe-sample interaction forces because prior art modules typically ignore the cantilever deflections and the variations in deflections resulting in image distortions at high imaging speeds. The equation that governs the relationship between probe sample interaction force and cantilever deflections is:

$$F_{t-s}(t)=-k_c d_{tot}(t)=-k_c[d_{TM}(t)+(A_{def}\cos(\omega_0 t+\phi))-A_{free}\cos(\omega_0 t)] \qquad (1)$$

Where, $k_c$ is the spring constant of the cantilever, $d_{tot}(t)$ is the total deflection of the cantilever, $d_{TM}(t)$ is the mean cantilever deflection per time period (TM-deflection), $A_{def}(t)$ is the instant tapping amplitude, and $A_{free}$ and $\Phi$ are the cantilever free amplitude and phase shift of the cantilever's response to the excitation, respectively.

Figure 2:
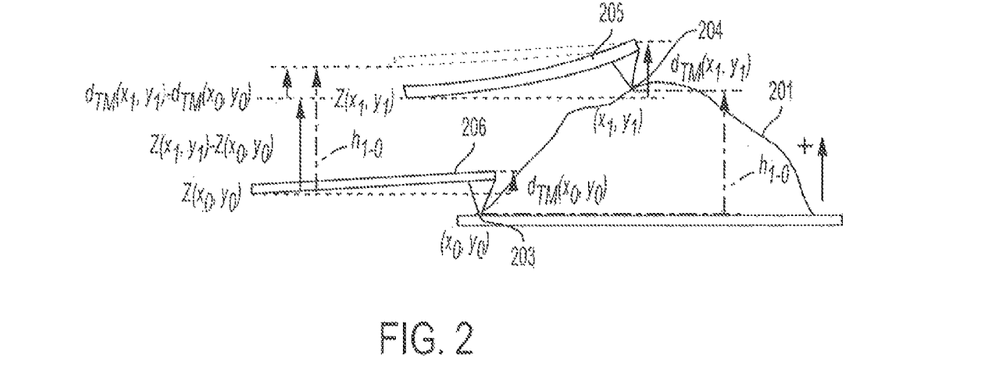
FIG. 2 is a schematic illustration of an example sample surface topography comprising two sample points and TM-deflection deflection at the two sample points, according to an embodiment.

Referring now to FIG. 2, typical sample topography quantification is illustrated. Examples of samples may include poly (ter-butyl acrylate) (PtBA), polystyrene-low-density polyethylene (PS-LDPE), styrene-butadiene-styrene (SBS), celgard, and biological samples. Sample size may be selected from about 1 sq. μm-10,000 sq. μm. A sample may be prepared for AFM imaging using techniques known in the art that, for simplicity, are not disclosed here. The height difference between any two points (203 and 204) on a sample surface (202), taking into account the TM-deflection may be represented by:

$$h_{1-0}=[z(x_1,y_1)-z(x_0,y_0)]+\epsilon[d_{TM}(x_1,y_1)-d_{TM}(x_0,y_0)] \qquad (2)$$

where:
$z(x,y)$=z-piezo displacement at point $(x,y)$;
$d_{TM}(x,y)$=mean deflection at point $(x,y)$; and
$\epsilon$=contact constant that depends on the probe-sample interaction regime. $\epsilon=-1$ when the probe-sample interaction is dominant by the long range attractive force (e.g., $A_{def}/A_{free} \in$ (0.5,0.8)), $\epsilon=1$ when the repulsive probe-sample interaction force appears, and $-1<<\epsilon<0$ when the tapping amplitude is close to the free vibration amplitude, i.e., $A_{def}\approx A_{free}$.

Thus, the above Equation (2) implies that the sample topography of the entire imaged area can be obtained with respect to one fixed reference point, e.g., point 0—the first sample point imaged—for convenience. Without loss of generality, in some embodiments, the height and deflection datum point 0 may be set as $z(x_0,y_0)=0$ and $d_{TM}(x_0,y_0)=d_{TM-d}$, where $d_{TM-d}$ is the mean deflection corresponding to the vibration amplitude of the probe at the set-point value, and thus the sample surface topography can be quantified as:

$$h(x,y)=z(x,y)+\epsilon[d_{TM}(x,y)-d_{TM-d}]=z(x,y)+\epsilon\Delta d_{TM}(x,y) \qquad (3)$$

Hence, at slow imaging speeds, where the cantilever probe can accurately follow the sample topography under the vibration amplitude control, i.e., $A_{def}$ is closely around the set-point value, the mean deflection $\Delta d_{TM}(x,y)$ variation is small enough and $d_{TM}(x,y)\approx d_{TM-d}$. Therefore, $h(x,y)\approx z(x,y)$, and the sample topography can be adequately quantified as the z-piezo displacement measured at each sample point.

However, with the imaging speed increase it is challenging to maintain such a stringent condition of $A_{def}\approx A_{free}$. Note that with even small scanning speed increases (i.e., the variation of the vibration amplitude is small), the variation of the instantaneous amplitude, $A_{def}$, may not be negligible and hence the variations of the mean deflection may still be pronounced. Such a mean deflection variation is typically not accounted for in the conventional DM-imaging and leads to image distortion and limits imaging speed.

Therefore, the imaging speed may be increased by taking into account the mean deflection in sample topography quantification as is described in the current disclosure.

FIG. 1B illustrates the contact mode AFM block diagram and may be slightly different from the dynamic modes of imaging. Primarily, in contact mode, the probe tip is "dragged" across the surface of the sample and the contours of the surface may be measured either using the deflection of the cantilever directly or, more commonly, using the feedback signal required to keep the cantilever deflection (i.e., the probe-sample interaction force) closely around the set-point value. Because the measurement of a static signal may be prone to noise and drift, low stiffness cantilevers are used to boost the deflection signal. Close to the surface of the sample, attractive forces could be quite strong, causing the tip to "snap-in" to the surface. Thus, contact mode AFM is almost always done at a depth where the overall force is repulsive, that is, in firm "contact" with the solid surface below any adsorbed layers. Furthermore, the vibration modes of the cantilever, in contact mode imaging, may not be excited, and the sample deformation may be assumed to be negligible. Therefore, unlike DM-imaging d(x,y) in contact mode imaging may represent the deflection and not the mean deflection, and the contact constant, c, may not be required. Taking into account these differences between contact mode and DM modes of imaging, height difference between any two points (203 and 204) on a sample surface (202), may be represented by:

$$h_{1-0} = h_{1-0} = [z(x_1,y_1) - z(x_0,y_0)] + [d(x_1,y_1) - d(x_0,y_0)] \quad (2A)$$

where,
$z(x_0,y_0)$=z-axis position of the sample point $(x_0,y_0)$;
$z(x_1,y_1)$=z-axis position of the sample point $(x_1,y_1)$;
$d(x_0,y_0)$=cantilever deflection at sample point $(x_0,y_0)$; and
$d(x_1,y_1)$=cantilever deflection at sample point $(x_1,y_1)$.
Thus, by choosing, $z(x_0,y_0)=0$ and $d(x_0,y_0)=d_{set}$ (set-point deflection), the sample surface topography may be quantified as:

$$h(x,y) = z(x,y) + [d(x,y) - d_{set}] \quad (3A)$$

Therefore, the imaging speed may be increased by taking into account the deflection in sample topography quantification as is described in the current disclosure.

The current disclosure in a first embodiment, describes an AFM with improved imaging speeds that includes an imaging module, which may operate to regulate the mean cantilever deflection using a control loop of inner-outer loop structure, in addition to the feedback loop that regulates the vibration amplitude (as discussed with respect to FIG. 1A), while maintaining the vibration of the probe. In another embodiment, a data driven online iterative feedforward controller may be integrated to the inner-outer loop structure to further improve the tracking of the sample topography.

In a first aspect, the current disclosure allows for increased imaging speeds in an adaptive-multi-loop mode imaging (AML-imaging) AFM by accounting for and regulating the variation of the cantilever deflection as discussed below.

Figure 3A:
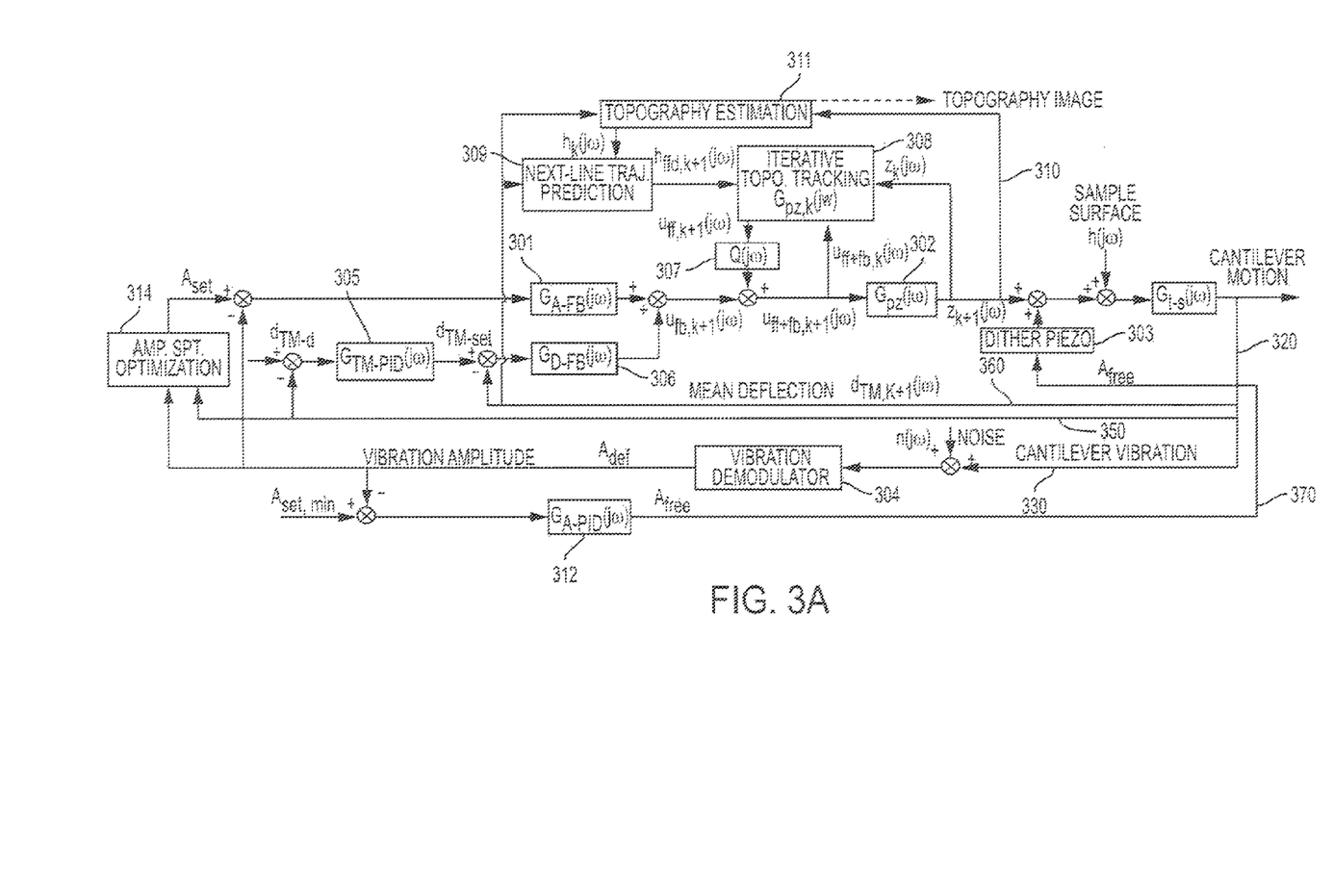
FIG. 3A is an illustration of an example adaptive-multi-loop mode imaging AFM control block diagram of the current disclosure, according to a first embodiment.

Referring now to FIG. 3A, there is provided a block diagram of an example AML-imaging module for increasing the imaging speed in an AFM. As shown in FIG. 3, the AML-imaging module may include: (i) a vibration amplitude feedback control loop (330); (ii) a feedback control in the inner-outer loop structure to regulate the mean deflection (320); (iii) an online optimization of the vibration amplitude ratio (314), (iv) a feedback controller to the probe vibration generator that minimizes the vibration amplitude (370), and (v) an online iterative feed forward controller (310) to overcome the time-delay of the vibration amplitude feedback loop in tracking the sample topography.

The vibration amplitude control loop 320 may regulate the AML-imaging vibration amplitude at a set point value using a vibration demodulator (e.g., lock-in-amplifier in case of TM imaging) 304, and a vibration amplitude controller 301 as discussed previously with respect to FIG. 1A. The vibration demodulator 303 may measure the averaged vibration amplitude or the peak force amplitude, and the feedback controller 301 may regulate the amplitude using a z-piezo actuator 302. Techniques for executing such a control loop, and related technology, are well known in the art and are therefore not described further in detail herein, except as may be helpful or necessary to understand operations of system.

In addition to the vibration amplitude feedback controller, the inner-outer loop structure 320 may regulate the mean deflection by regulating the averaged (vertical) position of the cantilever in each tapping period closely around a desired value to maintain a stable tapping. Specifically, the outer-loop 350 may regulate the mean deflection set-point in real-time, and the inner-loop 360 may track the regulated mean deflection set-point using controller 306. Controller 306 may be a feedback controller such as a PID-type controller.

The outer-loop may employ the following PID-type (Proportional Integral Derivative type) of control to regulate the mean deflection set-point, $d_{TM\text{-}set}(.)$:

$$d_{TM\text{-}set}(j+1) = k_I d_{TM\text{-}set}(j) + k_P e_{TM}(j) + k_D[e_{TM}(j-1) - e_{TM}(j)]$$

for $e_{TM}(j) = d_{TM\text{-}d} - d_{TM}(j)$, and $j=2 \ldots N-1$, \quad (4)

where:
N=total number of sampling periods per image;
$d_{TM\text{-}d}$=desired mean deflection;
$d_{TM}(j)$=mean deflection of the current sampling point; and
$K_P$, $K_I$ and $K_D$ are the PID parameters.

The desired mean deflection, $d_{TM\text{-}d}$, may be determined by the ratio of the chosen tapping-amplitude set-point to the free amplitude, $A_{set}/A_{free}$. Specifically, the $d_{TM\text{-}d}$ vs. $A_{def}/A_{free}$ relation may be measured a priori. The $d_{TM\text{-}d}$ vs. $A_{def}/A_{free}$ relationship may resemble a parabolic curve centering around $A_{def}/A_{free} \sim 50\%$.

While the current disclosure uses a PID controller, it will be understood to a person skilled in the art that different types of controllers may be used without deviating from the principles of the disclosure.

In an embodiment, the PID parameters $K_P=1$, $K_I=1$ and $K_D=\rho$, where $\rho$ may be the sample point-to-point gradient factor. In an embodiment, $\rho<1$. It will be understood that these PID values are example values and may be tunable for better performance.

Figure 5:
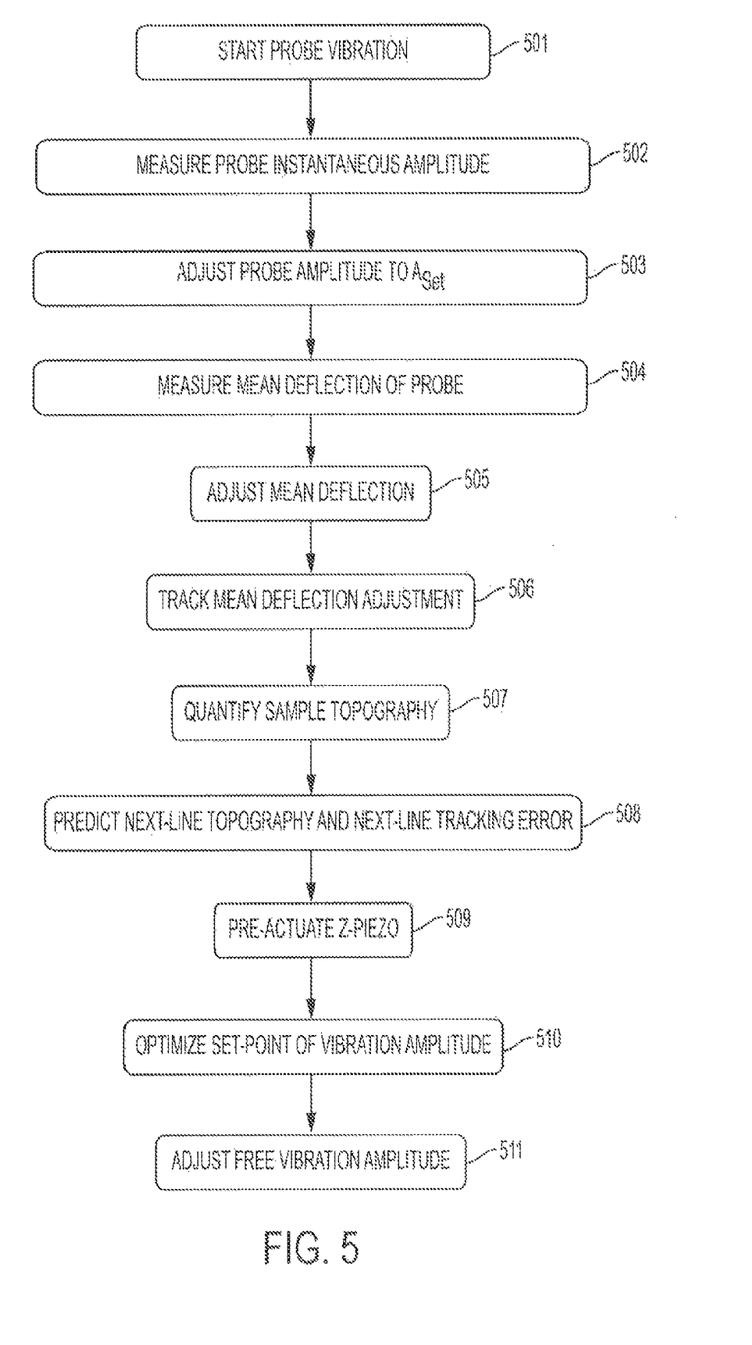
FIG. 5 is a flowchart illustrating the method of the adaptive-multi-loop mode imaging to quantify sample topography according to an embodiment.
Figure 6:
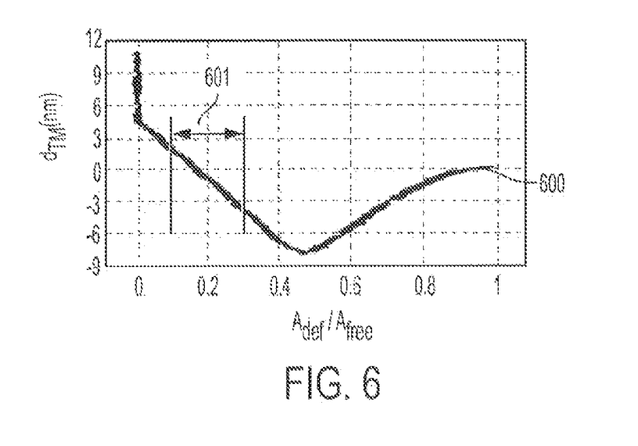
FIG. 6 is a graph illustrating an example relationship between the mean TM-deflection amplitude and the ratio of the RMS-vibration amplitude to the free vibration amplitude of the cantilever.

FIG. 6 depicts an example $d_{TM\text{-}d}$ vs. $A_{def}/A_{free}$ plot 600 for the tapping mode case, where the tip-sample interaction force increases significantly when the tapping ratio $A_{def}/A_{free}<10\%$, and when $A_{def}/A_{free}$ is larger than 80%, the increase of the scanning speed may quickly lead to the loss of contact. According to an embodiment, for the $d_{TM\text{-}d}$ vs. $A_{def}/A_{free}$ plot shown in FIG. 5, the desired mean deflection may be selected such that the corresponding $A_{def}/A_{free}$ is preferably between 10%-30% (601). While the current disclosure is based on the plot shown in FIG. 6, it will be understood to a person skilled in the art that different tapping ratios may be preferred for different samples and/or cantilevers depending on the specific measured $d_{TM\text{-}d}$ vs. $A_{def}/A_{free}$, without deviating from the principles of the current disclosure.

Furthermore, it will be understood that there may be other ways in which the outer-loop may regulate the mean deflection set-point in real-time. The foregoing merely lists a limited number of examples, and the embodiments herein are not limited to these examples.

It should be noted that, per equations (1) and (3), while the speed of the AML-imaging AFM may be increased by accounting for the mean deflection alone in sample topography quantification, it does not improve the tracking of the sample topography during imaging. Hence, as the imaging speed increases, the probe-sample interaction force may vary dramatically leading to loss of contact and/or annihilation of tapping. The current disclosure, in a second aspect, thus discloses an online iterative feedforward control applied to the z-piezo actuator 302 for maintaining the sample-topography tracking.

The set-point of the probe RMS vibration amplitude ($A_{set}$ in FIGS. 3A, 3B, and 3D) may be adjusted to account for the uncertainty and variation in the mean-deflection as compared to the RMS vibration amplitude relation (as shown in FIG. 6). The mean deflection $d_{TM}$ and the RMS vibration amplitude at the steady state may be measured in real time during the imaging process, and then used to construct part of the mean deflection vs. amplitude curve around the chosen desired mean deflection, $d_{TM\text{-}d}$. The steady state mean deflection $d_{TM}$ and the RMS vibration amplitude may be obtained by averaging the measured data over a period of time greater than the time constant of the mean-deflection feedback control loop and that of the RMS vibration amplitude loop, respectively. The amplitude set optimization controller 314 may then update the set point of the RMS-vibration amplitude $A_{set}$, based on the real time measured $d_{TM}$ vs. $A_{def}/A_{free}$ curve, by setting the vibration amplitude set-point $A_{set}$ to the value corresponding to the desired mean-deflection $d_{TM\text{-}d}$ on the $d_{TM}$ vs. $A_{def}/A_{free}$ curve As shown in FIG. 3A, the online iterative feed forward controller 308 for the z-piezo actuator 302 may be integrated to the vibration amplitude feedback loop 330. Particularly, the feedforward control input is obtained by implementing the following high-order modeling-free difference-inversion-based iterative-control (HOMDIIC) algorithm online:

$$U_{ff,0}(j\omega) = 0, \tag{5}$$

$$U_{ff,1}(j\omega) = \frac{U_{ff+fb,0}(j\omega)}{Z_0(j\omega)} H_{ffd,1}(j\omega), \tag{6}$$

$$U_{ff,k+1}(j\omega) = U_{ff,k} + \lambda \frac{U_{ff+fb,k}(j\omega) - U_{ff+fb,k-1}(j\omega)}{Z_k(j\omega) - Z_{k-1}(j\omega)} e_k(j\omega), k \geq 1 \tag{7}$$

$$e_k(j\omega) = H_{ffd,k+1}(j\omega) - Z_k(j\omega) \tag{8}$$

where:
'jω'=Fourier transform of the corresponding signal;
λ=pre-chosen constant to ensure the convergence of the iteration;
$U_{ff+fb,k}(.)$=total control input (feedback+feedforward) applied to the z-piezo actuator (i.e., $U_{ff+fb,k}(j\omega)=U_{ff,k}(j\omega)+U_{fb,k}(j\omega)$, see FIG. 3);
$Z_k(.)$=z-piezo displacement measured on the $k^{th}$ scan line; and
$H_{ffd,k+1}(.)$=desired trajectory that the z-piezo needs to track at the k+1$^{th}$ scanline.

The ratios in the above control law, $U_{ff+fb,0}(j\omega)/Z_0(j\omega)$ and $(U_{ff+fb,k}(j\omega)-U_{ff+fb,k-1}(j\omega))/(Z_k(j\omega)-Z_{k-1}(j\omega))$, essentially equal the inverse of the frequency response of the z-piezo actuator, and may be updated line-by-line iteratively throughout the whole imaging process. Such a data-driven online-updated inverse over a priori-obtained fixed model in the iterative scheme may allow for better robustness and tracking performance. Finally, the feedforward output in the time domain, $U_{ff+fb,k+1}(t)$, may be obtained via the inverse Fourier transform and applied during the k+1$^{th}$ line scanning.

Furthermore, it will be understood to those skilled in the art that there may be other ways in which the online feedforward control loop 310 may control the sample topography tracking, and that the foregoing merely lists one example algorithm, and that the embodiments herein are not limited to these examples.

The mean deflection may respond faster to the sample topography changes than the tapping amplitude. However, due to the compliance of the cantilever and the cantilever fixture (connecting the cantilever to the piezo actuator), time delay may still exist between the mean deflection change and that of the topography profile. As the scanning speed increases, such a time delay, albeit small, may become important and as a result, the spikes in the mean deflection may reach their (local) peaks after the probe already passes these sample locations. Even with advanced feedback control, such deflection spikes may still exist.

Thus, the feedforward controller 308 in the AML imaging module, according to an embodiment, may employ a data driven iterative control algorithm, such as the algorithm given in equations 5-8, to significantly improve the tracking of the sample topography during high-speed imaging. Additionally and/or alternatively, the feedforward controller may 308 utilize the prediction of the sample topography and the sample tracking error on the next line to significantly reduce the tracking error (i.e., the cantilever deflection variation) around the sample regions with sudden and dramatic changes, such as the regions with cliffs and/or edges as shown in FIG. 4. Specifically, the feedforward controller 308, by combining the data-driven iterative controller with the prediction based desired trajectory of the next line (as discussed previously), may significantly reduce the variation of the cantilever deflection around the regions with cliffs and/or edges. As shown in FIG. 4, large spikes occurred around the "cliff" and "edges" of the square pitch sample area. The amplitude of these spikes may be dramatically reduced by using the data-driven iterative feedforward control, and then may be further reduced by integrating the prediction of the tracking error into the feedforward control, as shown in FIG. 4.

The predicted sample topography and the predicted next-line mean deflection tracking error may be accounted for through the feedforward controller 308 to track the modified desired trajectory $H_{ffd,k}(.)$, as in equation (7). The modified desired trajectory—for the feedforward control input to track—enables the z-piezo to drive the cantilever to respond in advance (i.e., pre-actuate) to the topography change, thereby reducing the amplitude of the deflection spikes. For example, at the end of the $k^{th}$ line scanning, the sample topography profile of the k+1$^{th}$ line, $h_{k+1}(t)$, may be predicted by using that of the $k^{th}$ scanline (quantified via Equation 5), i.e., $h_{k+1}(t) \approx h_k(t)$. Such an approximation is reasonable because with enough scanlines, the line-to-line topography variations are small. Similarly, the mean deflection tracking error on the k+1$^{th}$ scanline may be predicted as that on the $k^{th}$, $d_{TM,k}(.)-d_{TM\text{-}d}$, i.e., the tracking error, if the same control were applied for the same sample topography. Then, the next-line desired trajectory, $H_{ffd,k+1}(t)$, may be obtained by combining the above two predictions as follows:

$$h_{ffd,k+1}(j)=h_k(j)+\alpha[d_{TM,k}(j)-d_{TM\text{-}d}], j=1, \ldots N_1. \tag{9}$$

where,
$N_1$=total sampling points per image line; and
α=correction factor.

The mean deflection may be introduced in the above iterative algorithm (equation 9) to reduce the amplitude of the interaction force when imaging sample areas of rapid and large topography changes (vertically). In certain embodiments, the correction factor α may be tuned based on the estimated height of the sample surface features.

In an embodiment, during the imaging process, the above defined iterative scheme may be applied repetitively to scan on the first line until a convergence is reached, i.e., until the difference of the z-piezo displacement between two consecutive iterations is small enough, e.g., close to the noise level. In certain embodiments, 2-3 repetitive scans on the first line may be performed to enable scanning the rest of the sample without iteration. In certain other embodiments, 7-8 repetitive scans on the first line may be performed. The converged input may then be used as the initial input for the iteration on the next scanline. By maintaining the correction rate of the iterative input (i.e., the convergence rate) as faster than line-to-line the input change caused by the sample topography change, the iterative control input may only need to be updated once, i.e., the rest of the sample may be imaged without iterations. Such use of the z-piezo dynamics may provide a larger "working" bandwidth, i.e., a better tracking performance at high-speed, as the feedback controller tends to reduce the open-loop bandwidth.

In certain embodiments, to avoid the noise being fed back into the closed-loops via the feedforward channel, the feedforward control input, $U_{ff,k+1}(.)$ may be passed through a zero-phase low-pass filter $Q(j\omega)$ 307:

$$U_{ff,k+1}(\check{j}\omega)U_{ff,k+1}(\check{j}\omega)=Q_b(\check{j}\omega)C_{lead}(\check{j}\omega)U_{ff,k+1}(\check{j}\omega) \quad (10)$$

where:
$Q_b(\check{j}\omega)$=low-pass filter; and
$C_{lead}(j\omega)$=phase-lead compensator.

As the entire next-line feedforward control input is known a priori, the above noncausal zero-phase filter may be implemented online.

In an embodiment, $A_{def}/A_{free}$ may be equal to 20%, such that $d_{TM-d}$ may be approximately zero. In certain other embodiments, $A_{def}/A_{free}$ may be equal to 30%, such that $d_{TM-d}$ may be approximately zero. In certain other embodiments $A_{def}/A_{free}$ may be between 20% and 30%, such that $d_{TM-d}$ may be approximately zero.

It should be noted that, while the speed of the AML-imaging AFM may be increased by accounting for the mean deflection and performing feedforward tracking of the sample topography during imaging, the tapping amplitude is still kept constant at a pre-determined value $A_{set}$. Hence, the imaging speed may increase and the probe-sample interaction force may vary, which may lead to instable tapping and increased noise in the signal. The current disclosure, in a third aspect, thus discloses an online iterative control applied to the z-piezo actuator 302 for maintaining stable tapping.

Figure 3B:
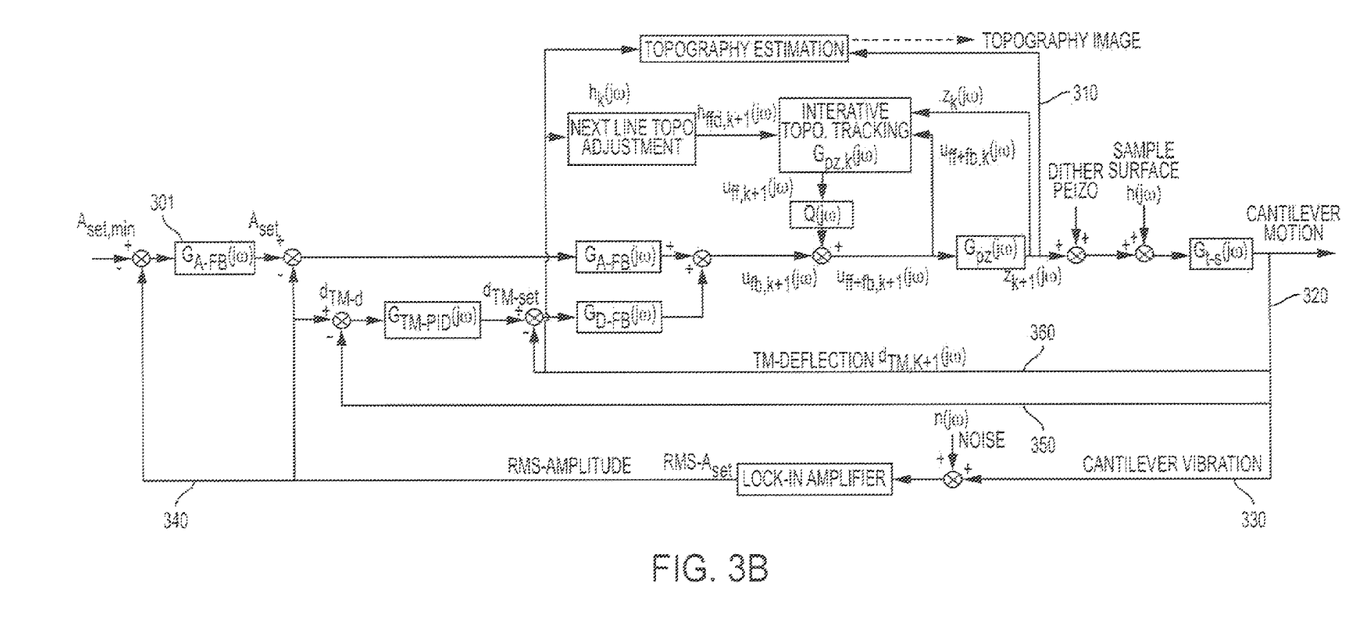
FIG. 3B is an illustration of an example adaptive-multi-loop mode imaging AFM control block diagram of the current disclosure, according to a second embodiment.

FIG. 3B illustrates an example AML-imaging module block diagram according to an embodiment of this disclosure. As illustrated by FIG. 3B, the vibration amplitude feedback control loop 330 as shown in FIG. 3A may be modified by addition of a feedback loop 340 to further reduce the probe-sample interaction force by adaptively adjusting the tapping amplitude.

In some embodiments, the vibration amplitude (i.e., the tapping amplitude in TM imaging, the peak force amplitude in PFM imaging, or the vibration amplitude in NCM imaging) may be maintained closely around the minimal amplitude needed to maintain a stable tapping and desired signal to noise ratio. Specifically, the outer-loop 340 may regulate the set-point of the vibration amplitude, $A_{set}$, by adjusting it online and point-by-point (i.e., $A_{set}$ may not be a predetermined constant) using controller 301. In certain embodiments, the $A_{set}$ may be regulated by first adjusting the free oscillation amplitude $A_{free}$ point-by-point, and then determining the corresponding $A_{set}$ based on a previously measured $A_{free}$ versus $A_{set}$ relationship at any given mean "mean deflection" value. Controller 301 may be a feedback controller such as a PID-type controller.

In certain embodiments, the controller 301 may be a PID-type controller that regulates the $A_{free}$ using the following equation:

$$A_{free}(j+1)=k_{ia}A_{free}(j)+k_{pa}e_a(j)+k_{da}[e_a(j-1)-e_a(j)]$$

for $e_a(j)=A_{min}-A_{def}(j)$, and $j=2\ldots N-1$, \quad (11)

where:
N=total number of sampling periods per image;
$A_{min}$=lower limit of the required vibration amplitude to maintain the desired signal to noise ratio and a stable tapping of the cantilever;
$A_{def}(j)$=vibration amplitude at the current sampling point; and
Kia, $K_{pa}$ and $K_{da}$ are the PID control parameters.

The desired vibration amplitude set-point at a sampling point (j+1), $A_{set}(j+1)$, may be determined based on the pre-measured relationship that relates the free vibration amplitude at sampling point (j+1) determined using Eq. (11), $A_{free}$ (j+1), and the mean deflection, $d_{TM-d}$, using the following equation:

$$A_{set}(j+1)=f(A_{free}(j+1),d_{TM-d}) \quad (12)$$

where:
$f(A_{free}$ (j+1), $d_{TM-d})$=function which defines the $A_{free}$ versus $A_{set}$ relationship at the given mean deflection value. The relationship may be pre-determined, i.e., an explicit expression off $(A_{free}$ (j+1), $d_{TM-d})$ may not be needed, and may be determined experimentally to obtain a numerical relationship.

In certain embodiments, the desired mean deflection may be chosen to be a constant as close to zero as practically possible.

Figure 3C:
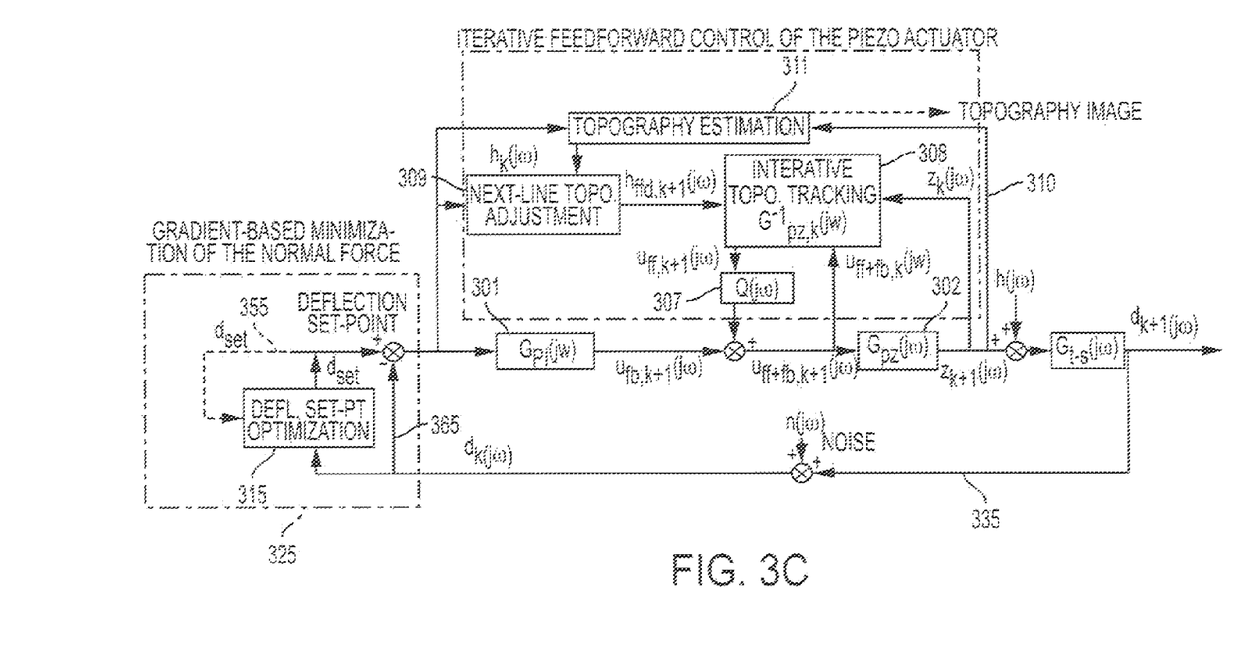
FIG. 3C is an illustration of an example adaptive-multi-loop mode imaging AFM control block diagram of the current disclosure, according to a third embodiment, which may be incorporated in contact mode AFM.

It should be noted that while the current disclosure explains the incorporation and use of the AML-imaging module in various dynamic modes AFMs, such as the tapping mode, the AML-imaging module may also be incorporated in a contact mode AFM to increase the imaging speed, without deviating from the principles of the current disclosure. FIG. 3C illustrates an example AML-imaging module block diagram, incorporated in a contact mode AFM, according to an embodiment of this disclosure.

As discussed previously with respect to FIG. 1B, in contact mode imaging, the imaging speed may be increased by taking into account the deflection in sample topography quantification. Hence, as shown in FIG. 3C, in contact mode imaging the inner-outer feedback loop (325) may adjust the deflection set-point line-by-line (not point-by-point as in DM-imaging) to maintain the deflection, and thus the probe-sample interaction force, around the minimal level required for maintaining a stable contact during scanning. Specifically, the outer-loop 355 may regulate the deflection set-point in real-time, and the inner-loop 365 may track the regulated deflection set-point using controller 365. Controller 365 may be a feedback controller such as a PID-type controller.

The outer loop may employ the following gradient based minimization of normal force, to regulate the deflection set point, as described by the equations:

$$d_{set,0}=d_{set,org}, \quad (13)$$

$$d_{set,k+1}=d_{set,k}-[\min(\hat{d}_{k+1}(t))-D^*_{min}], k\geq 1 \quad (14)$$

with $\hat{d}_{k+1}(t) \triangleq d_k(t)+\rho[(d_k(t)-d_{k-1}(t))]$, for $t\in[0,T_{scan}]$, \quad (15)

where:

$d_{set,0}$=deflection set-point on the first scanline;
$d_{set,k}$=deflection set-point on the $k^{th}$ scanline;
$d_{k+1}(t)$=minimum of the predicted detection at the $k+1^{th}$ scanline;
$D^*_{min}$=minimum deflection/force needed to maintain the stable repulsive tip-sample interaction (i.e., the threshold value);
$T_{scan}$=scanning period;
$d_{set,org}$=original deflection set-point chosen a priori to the imaging process; and
$\rho \in [0,1]$=gradient factor, and can be tuned to improve the imaging quality.

The data-driven iterative feed-forward control loop 310 for the piezo actuator 302, in contact mode imaging may operate in the same way as the feed-forward control loop in the DM-imaging module, as discussed previously. For example, the next-line desired trajectory, $H_{ffd,k+1}(t)$, may be obtained by using equations 5, 6, and 9.

Figure 3D:
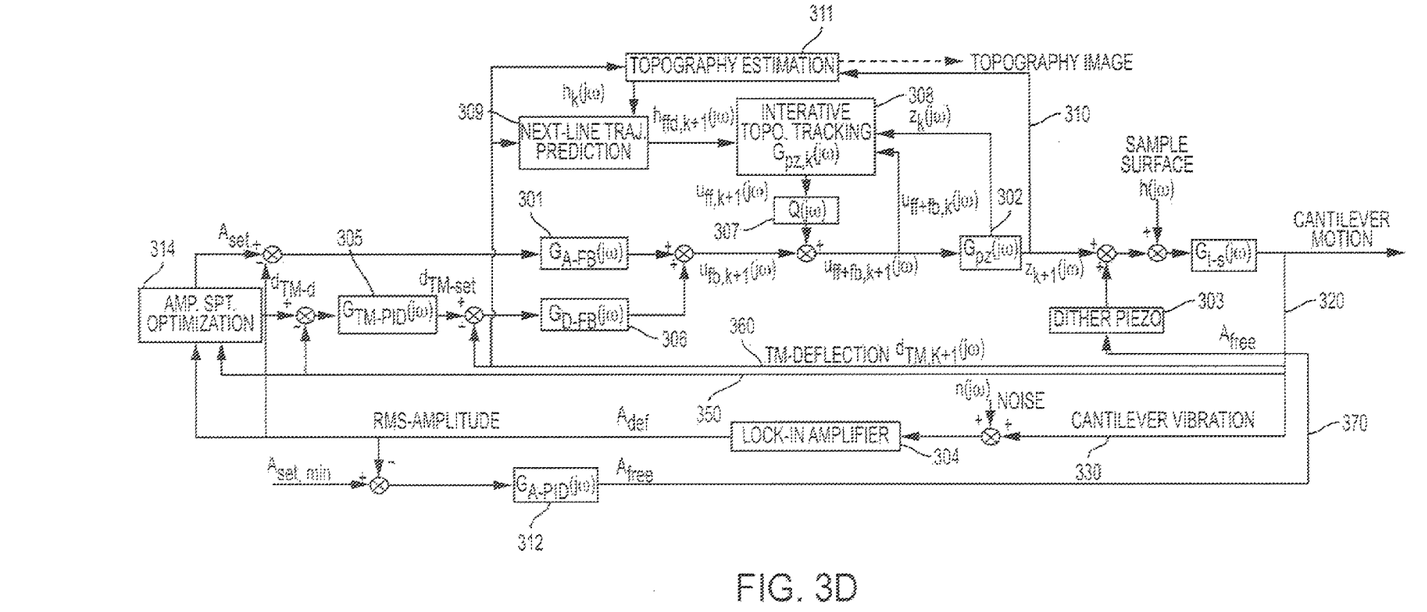
FIG. 3D is an illustration of an example adaptive-multi-loop mode imaging AFM control block diagram of the current disclosure, according to a forth embodiment, which may be incorporated in tapping mode AFM.
Figure 4A:
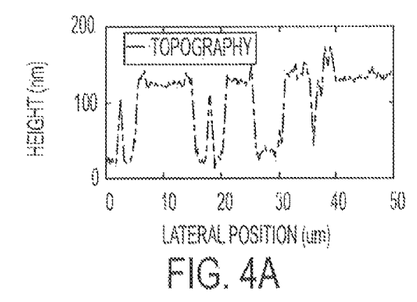
FIG. 4 is a graph illustrating cliff-caused spikes in the mean deflection, and reduction in the cliff-caused spikes using an iterative feedforward control of the current disclosure, according to an embodiment.
Figure 4B:
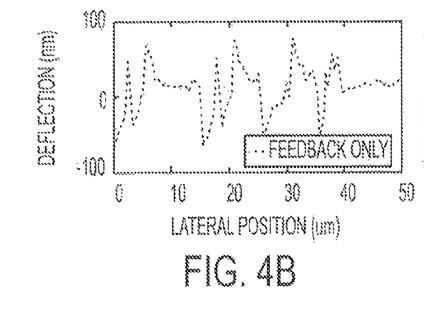
Figure 4C:
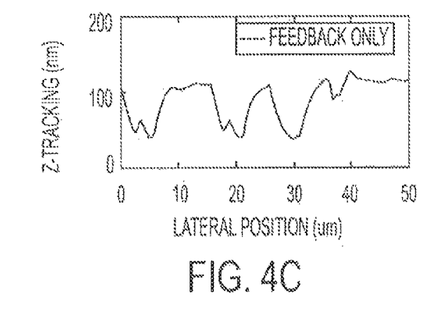
Figure 4D:
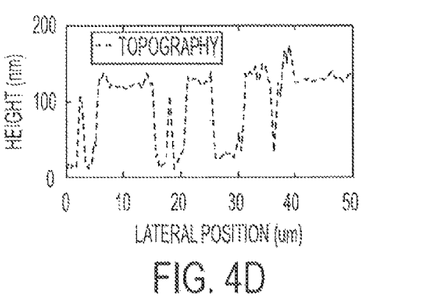
Figure 4E:
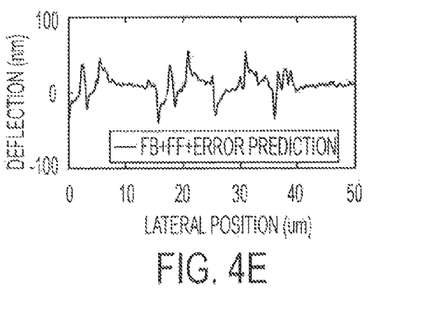
Figure 4F:
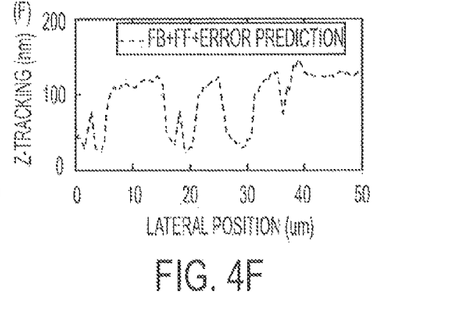

FIG. 3D illustrates an example AML-imaging module block diagram according to an embodiment of this disclosure, for use in a tapping mode AFM. The imaging module may operate in the same manner as illustrated with respect to the imaging module of FIG. 3A.

In certain embodiments, the above disclosed signals may be acquired through a data acquisition system such as, for example, under the Matlab xPC-target environment. Other examples may include DSP-based data acquisition and computation system, FPGA-based data acquisition and computation system, or any other similar systems known in the art.

In summary, the advantage and efficacy of the AML-imaging technique, of the current disclosure, over current imaging techniques (include the DM-imaging and the CM-imaging) may be explained and appreciated using the experimental results shown in FIG. 4, where imaging of a calibration sample of square-like pitches by using the current imaging techniques and the AML-imaging technique is compared. FIG. 4 (a) shows the cross-section of the sample topography to be imaged. Due to the step-like sample feature, it may be challenging to track the edges of the pitches accurately. For example, as shown in FIG. 4 (b), large-spikes may appear in the cantilever deflection signal (i.e., the variation of the probe-sample interaction force) upon the up- and down-edges of the sample when using the conventional imaging technique with feedback only. As a result, the image profile measured using the conventional imaging technique, as shown in FIG. 4 (c), failed to capture the edges of the sample profile (compare FIG. 4 (a) to FIG. 4 (c)). However, using the AML-imaging technique, the large-spikes in the cantilever deflection may be reduced, as shown in FIG. 4 (e). This improvement may be achieved by using the data-driven iterative feedforward control coupled with the use of both the predicted next-line sample profile and the predicted next-line tracking error in the iterative control, along with the added mean-deflection feedback loop (for the DM-imaging) and the set-point optimization. As a result, the tracking of the sample topography may be significantly improved (see FIG. 4 (f)), particularly around the up- and down-edges. Moreover, by using the sample topography quantification of this disclosure (Equation (3) and (3a)) that utilizes both the tracked sample topography and the cantilever deflection, the sample topography obtained by the AML-imaging technique may further be improved, and much closer to the original sample topography, as shown in FIG. 4 (d).

Referring now to FIG. 5, an example flow-chart diagram of the algorithm underlying the operating principles of the present AML-imaging mode in an embodiment, as discussed above, is disclosed. In step 501, a dither piezo may start the probe vibrations to initiate the probe sample interaction. The logic may proceed to 502 to measure, in real time, the instantaneous amplitude of the probe vibrations using a vibration demodulator 304. The measurements may be supplied to the vibration amplitude feedback controller 301 so that the controller may adjust the probe vibration amplitude to a desired $A_{set}$ in step 503.

In step 504, the logic may measure the mean deflection in the outer loop 350, and adjust it using the feedback controller 305 in step 505. The logic may also track the mean deflection adjustment in the inner loop 360 in step 506. As discussed, the optimum adjustment value is determined experimentally such as, for example, prior to the operating the AFM system.

In step 507, the logic may quantify the sample topography based on the z-piezo displacement and the mean deflection. After the quantification, the logic may also predict next-line sample topography and the next-line tracking error, in step 508, using the data-driven online iterative feedforward control loop 310 and pre-actuate the z-piezo based on the prediction in step 509.

In step 510, the set-point of the vibration amplitude may be optimized online using the controller 314 so that the set-point of the vibration can be updated based on the real time measured mean deflection and vibration amplitude ratio relation, to account for the uncertainty and variation in the relation between the mean deflection amplitude and vibration amplitude ratio.

In step 511, the free vibration amplitude may be adjusted to minimize the vibration-related tip-sample interaction force. The PID controller 312 may be used to utilize the difference between the real-time measured vibration amplitude and the a priori chosen minimal vibration amplitude to update the free vibration amplitude.

Figure 7:
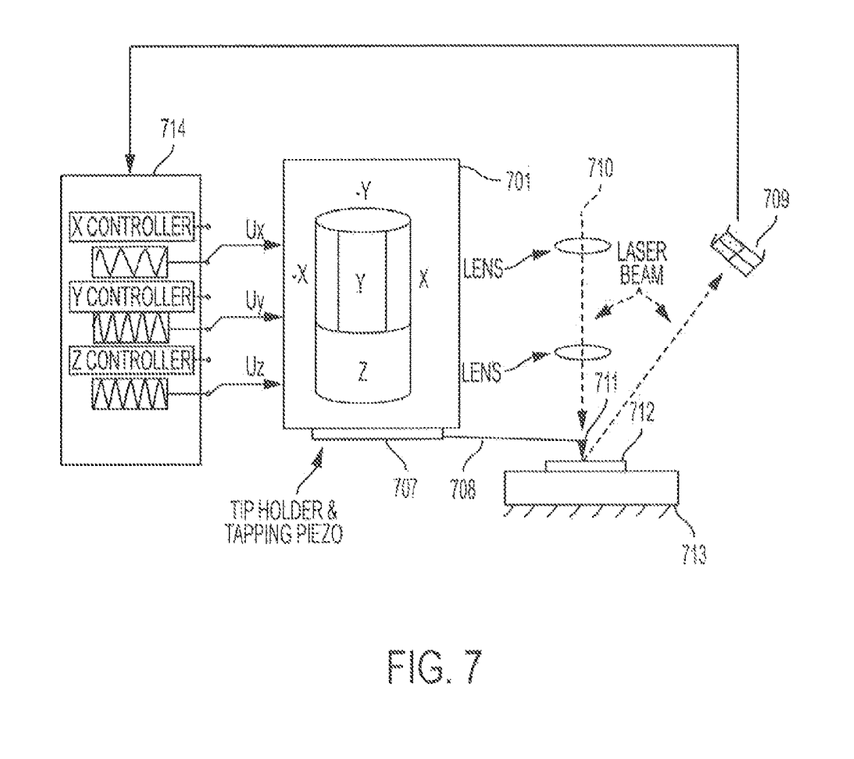
FIG. 7 is a schematic representation of an example Atomic Force Microscope system according to an embodiment.

Referring now to FIG. 7, an AFM system, according to an embodiment, includes a microscale cantilever 708 with a sharp probe 711 at its end which may be used to scan the surface of a sample 712. The cantilever is supported by a base (cantilever holder) 707 at another end thereof. When the probe is brought into proximity to a sample surface, the forces between the tip and the sample may lead to a deflection of the cantilever. The deflection of the cantilever may be measured in an optical arrangement including a laser 710 and an array of photodiodes (detector) 709.

Scanner 701 may generate relative motion between the probe 711 and the sample 712 while the probe-sample interaction is monitored. In certain embodiments, the scanner may be a scanning probe microscopy (SPM) scanner. In this way, images or other measurements of the sample may be obtained. Scanner 701 may include one or more actuators that usually generate motion in three orthogonal directions (XYZ). Scanner 701 may be a single integrated unit such as a piezoelectric tube actuator that moves either the sample or the probe in all three axes. Alternatively, the scanner may be an assembly of multiple separate actuators. In some embodiments, the scanner may be separated into multiple components, for example an xy actuator that moves the sample and a separate z-actuator that moves the probe. During the scanning of the probe with regard to the sample surface, a controller 714 may be employed which may include a feedback mechanism for controlling a SPM scanner 701 to actuate the z-piezo actuator, that may be mounted in the base 707, in accordance with the disclosure as discussed above. Signals from the array of photodiodes 709 are transmitted to the controller 714. The feedback mechanism includes the AML-imaging module as discussed with respect to FIG. 3A.

While the currently disclosed embodiments employ sample tracking in the lateral x-y direction using a z-piezo-actuator (along vertical axis), it will be understood to those skilled in the art that sample tracking may be performed in other directions in accordance with the principles disclosed in this disclosure.

The controller 614 may be a part of a central processing unit of the system, and may perform calculations and logic operations required to execute a program. The processing unit, alone or in conjunction with one or more of the other elements, may be a processing device, computing device or processor as such terms are used within this disclosure. As used in this document and in the claims, the term "processor" may refer to a single processor or any number of processors in a set of processors. Read only memory (ROM) and random access memory (RAM) constitute examples of memory devices. Additional memory devices may include, for example, an external or internal disk drive, a hard drive, flash memory, a USB drive or another type of device that serves as a data storage facility. As indicated previously, these various drives and controllers are optional devices. Additionally, the memory devices may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM and/or the RAM. Optionally, the program instructions may be stored on a non-transitory, computer readable medium such as a compact disk, a digital disk, flash memory, a memory card, a USB drive, an optical disc storage medium, and/or other recording medium.

In certain embodiments, the imaging speed may be selected from about 0.1 Hz to 40 Hz. In certain other embodiments, the imaging speed may be dependent on factors such as the size of the sample, topography of the sample, and the type of the AFM.

In an embodiment, the added mean deflection feedback loop 310 along with the feedforward controller 320 may substantially accelerate the tracking of the sample topography during the AML-imaging process. Maintaining the mean deflection around the desired value, in turn, helps to maintain the RMS tapping amplitude around the set-point. Moreover, the averaged probe-sample interaction force may be minimized once by maintaining the tapping amplitude around the level where the corresponding mean deflection is minimal. In addition, the feedforward controller, through the tracking of the optimal predicted sample topography profile and rapid convergence, further reduces the oscillations of the tapping amplitude upon sudden sample topography variation as the scanning speed increases. Therefore, the TM-deflection loop as disclosed here tracks the sample topography during the imaging, while maintaining the averaged probe-sample force near the minimal.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of imaging a sample using a high speed dynamic mode atomic force microscope, wherein the method comprises:
   scanning a tip of a cantilever probe over a surface of the sample;
   regulating a vibration amplitude of the tip to remain constant at a set point value ($A_{set}$), via a first signal generated in a first feedback controller;
   measuring a mean tapping deflection of the tip;
   regulating the mean tapping deflection via a second signal generated in a second feedback controller;
   tracking and measuring an adjustment to the measured mean tapping deflection during the regulating; and
   generating an image topography of the sample based on the first signal, the second signal, and the measured adjustment of the mean tapping deflection of the cantilever probe.

2. The method of claim 1, wherein the high-speed dynamic mode atomic force microscopy comprises one or more of the following: tapping mode, non-contact mode, and peak force tapping mode.

3. The method of claim 1, wherein regulating the mean tapping deflection comprises:
   determining a desired mean deflection using a ratio of $A_{set}$ and a free amplitude; and
   adjusting the measured mean tapping deflection to the desired mean deflection.

4. The method of claim 3, wherein the desired mean deflection is determined such that the ratio of $A_{set}$ and the free amplitude is from about 10%-30%.

5. The method of claim 1, wherein the second feedback controller comprises an inner-outer feedback loop structure, wherein an outer feedback loop regulates the mean tapping deflection, and an inner loop nested within the outer loop performs the tracking and measuring of the adjustment to the measured mean tapping deflection during the regulating.

6. The method of claim 5, wherein the outer feedback loop is a proportional integral derivative (PID)-type controller having PID parameters $K_P$, $K_I$, and $K_D$.

7. The method of claim 6, wherein the PID-type controller employs the following algorithm:

$$d_{TM\text{-}set}(j+1)=k_I d_{TM\text{-}set}(j)+k_P e_{TM}(j)+k_D[e_{TM}(j-1)-e_{TM}(j)]$$

for $e_{TM}(j)=d_{TM\text{-}d}-d_{TM}(j)$, and $j=2\ldots N-1$, where:
N is total number of sampling periods per image;
$d_{TM\text{-}d}$ is desired mean deflection;
$d_{TM}(j)$ is mean deflection of the current sampling point; and
$K_P$, $K_I$ and $K_D$ are the PID parameters.

8. The method of claim 7, wherein the PID parameters have the following values: $K_P=1$, $K_I=1$, and $K_D=\rho$, and wherein $\rho$ is a sample point-to-point gradient factor.

9. The method of claim 8, wherein $\rho<1$.

10. The method of claim 6, wherein the PID-type controller employs the following algorithm:

$$d_{set,0}=d_{set,org},$$

$$d_{set,k+1}=d_{set,k}-[\min(\hat{d}_{k+1}(t))-D^*_{min}], k\geq 1$$

with $\hat{d}_{k+1}(t)\triangleq d_k(t)+\rho[(d_k(t)-d_{k-1}(t))]$, for $t\in[0,T_{scan}]$, where:
$d_{set,0}$ is deflection set-point on the first scanline;
$d_{set,k}$ is deflection set-point on the $k^{th}$ scanline;

$d_{k+1}(t)$ is minimum of the predicted detection at the $k+1^{th}$ scanline;

$D^*_{min}$ is minimum deflection/force needed to maintain the stable repulsive tip-sample interaction;

$T_{scan}$ is scanning period;

$d_{set,org}$ is original deflection set-point chosen a priori to the imaging process; and $\rho \epsilon [0,1]$ is gradient factor which can be tuned to improve the imaging quality.

11. The method of claim 1, further comprising optimizing $A_{set}$ online based on a real time relationship between the measured mean deflection and vibration amplitude ratio of the $A_{set}$ and a free amplitude.

12. The method of claim 11, further comprising predicting a next-line sample topography and a next-line tracking error for tracking of the mean tapping deflection adjustment, via a third feedback controller.

13. The method of claim 12, wherein the third feedback controller is a feedforward controller comprising a data-driven iterative learning controller.

14. The method of claim 13, wherein the feedforward controller implements the following algorithm to obtain a control input:

$$U_{ff,0}(j\omega) = 0,$$

$$U_{ff,1}(j\omega) = \frac{U_{ff+fb,0}(j\omega)}{Z_0(j\omega)} H_{ffd,1}(j\omega),$$

$$U_{ff,k+1}(j\omega) = U_{ff,k} + \lambda \frac{U_{ff+fb,k}(j\omega) - U_{ff+fb,k-1}(j\omega)}{Z_k(j\omega) - Z_{k-1}(j\omega)} e_k(j\omega), k \geq 1$$

$$e_k(j\omega) = H_{ffd,k+1}(j\omega) - Z_k(j\omega),$$

where:

$j\omega$ is Fourier transform of the corresponding signal;

$\lambda$ is pre-chosen constant to ensure the convergence of the iteration;

$U_{ff+fb,k}(.)$ is total control input (feedback+feedforward) applied to the z-piezo actuator;

$Z_k(.)$ is z-piezo displacement measured on the $k^{th}$ scan line; and $H_{ffd,k+1}(.)$ is desired trajectory that the z-piezo needs to track at the $k+1^{th}$ scanline.

15. The method of claim 13, wherein the feedforward controller further comprises a zero-phase low-pass filter configured to filter noise from being fed back to the feedforward controller.

16. The method of claim 12, further comprising utilizing the prediction of the next-line sample topography and the next-line tracking error to reduce tracking error in a region of the surface of the sample with a feature providing a sudden and dramatic change comprising a cliff or an edge.

17. The method of claim 16, wherein utilizing the prediction of the next-line sample topography and the next-line tracking error to reduce tracking error comprising obtaining a next-line desired trajectory using:

$$h_{ffd,k+1}(j) = h_k(j) + \alpha[d_{TM,k}(j) - d_{TM-d}], j=1, \ldots N_1,$$

where:

$N_1$ is total sampling points per image line; and $\alpha$ is correction factor.

18. The method of claim 17, wherein a value of $\alpha$ is tuned based on an estimated height of the feature.

19. The method of claim 18, wherein obtaining the next-line desired trajectory further comprises performing repetitive scans on a first line until a convergence is reached, and using the convergence as an initial input for an iteration of a next scan line.

20. A method of imaging a sample using a high speed dynamic mode atomic force microscope, wherein the method comprises:

scanning a tip of a cantilever probe over a surface of the sample;

regulating a vibration amplitude of the tip to remain constant at a set point value ($A_{set}$), via a first signal generated in a first feedback controller;

measuring a mean tapping deflection of the tip;

regulating the mean tapping deflection via a second signal generated in a second feedback controller;

tracking and measuring an adjustment to the measured mean tapping deflection during the regulating;

predicting a next-line sample topography and a next-line tracking error for tracking of the mean tapping deflection adjustment, via a third feedback controller;

using the predicted next-line sample topography and the next-line tracking error in regulating the mean tapping deflection; and generating an image topography of the sample based on the first signal, the second signal, and the measured adjustment of the mean tapping deflection of the cantilever probe.

21. The method of claim 20, further comprising an online iterative control applied to a z-piezo actuator to maintain stable tapping.

22. The method of claim 21, wherein applying the online iterative control comprises regulating $A_{set}$ by adjusting it online and point-by-point.

* * * * *

UNITED STATES PATENT AND TRADEMARK OFFICE
CERTIFICATE OF CORRECTION

PATENT NO.        : 10,041,970 B2
APPLICATION NO.   : 15/326237
DATED             : August 7, 2018
INVENTOR(S)       : Qingze Zou et al.

Page 1 of 1

It is certified that error appears in the above-identified patent and that said Letters Patent is hereby corrected as shown below:

In the Specification

At Column 1, Line number 5, enter the following:
This invention was made with government support under Grant CMMI-1066055 awarded by the National Science Foundation (NSF). The government has certain rights in the invention.

Signed and Sealed this
Eleventh Day of December, 2018

Andrei Iancu
*Director of the United States Patent and Trademark Office*